(12) United States Patent
Jeon et al.

(10) Patent No.: US 8,701,850 B2
(45) Date of Patent: Apr. 22, 2014

(54) ASSEMBLY STRUCTURE OF FRICTION DEVICE FOR AUTOMATIC TRANSMISSION

(71) Applicants: Hyundai Motor Company, Seoul (KR); Kia Motors Corp., Seoul (KR)

(72) Inventors: Jae Young Jeon, Osan-si (KR); Seong Wook Ji, Ansan-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/676,795

(22) Filed: Nov. 14, 2012

(65) Prior Publication Data

US 2014/0001003 A1 Jan. 2, 2014

(30) Foreign Application Priority Data

Jun. 29, 2012 (KR) ........................ 10-2012-0070594

(51) Int. Cl.
*F16D 21/00* (2006.01)

(52) U.S. Cl.
USPC .................................................. 192/48.611

(58) Field of Classification Search
USPC ................... 192/110 R, 48.611, 48.609, 3.63
See application file for complete search history.

(56) References Cited

U.S. PATENT DOCUMENTS

| 5,480,361 | A | * | 1/1996 | Murakami et al. | 475/328 |
| 5,579,883 | A | * | 12/1996 | Tsukamoto et al. | 192/48.611 |
| 6,095,941 | A | * | 8/2000 | Martin et al. | 475/318 |
| 6,309,322 | B1 | * | 10/2001 | Shim | 475/269 |
| 7,247,114 | B2 | * | 7/2007 | Kaneda et al. | 475/116 |
| 8,109,374 | B2 | * | 2/2012 | Ando | 192/48.1 |

FOREIGN PATENT DOCUMENTS

| JP | 2003-301861 | 10/2003 |
| KR | 10-2005-0047982 A | 5/2005 |

\* cited by examiner

*Primary Examiner* — David D Le
*Assistant Examiner* — David J Hlavka
(74) *Attorney, Agent, or Firm* — Morgan, Lewis & Bockius LLP

(57) ABSTRACT

A friction device assembly structure for an automatic transmission includes a first friction device and an end play adjustment element. The first friction device includes a plurality of discs and a plurality of plates which are alternately arranged and configured such that a frictional force is created between the discs and the plates by the pressing force of a piston. The end play adjustment element is provided on an end of the first friction device to adjust an end play defined between the first friction device and the piston. The end play adjustment element is hollow such that an inner diameter thereof is greater than an outermost diameter of a second friction device which is provided inside the first friction device. Thereby, the end play adjustment element is able to be assembled without any interference from the second friction device.

4 Claims, 2 Drawing Sheets

ASSEMBLY STRUCTURE OF FRICTION DEVICE FOR AUTOMATIC TRANSMISSION

CROSS-REFERENCE TO RELATED APPLICATION

The present application claims priority of Korean Patent Application Number 10-2012-0070594 filed Jun. 29, 2012, the entire contents of which application is incorporated herein for all purposes by this reference.

BACKGROUND OF INVENTION

1. Field of Invention

The present invention relates to a friction device assembly structure for an automatic transmission in which an inner diameter of an end play adjustment element for adjusting the end play between a first friction device and a piston is designed such that a second friction device is prevented from interfering with the end play adjustment element, thus enhancing the ease of assembly of the friction device.

2. Description of Related Art

Generally, automatic transmissions include a torque converter, a gear shift mechanism which is connected to the torque converter to change the speed of the output of an engine, and a control circuit which selectively operates gears of the gear shift mechanism depending on the driving conditions of a vehicle.

In the gear shift mechanism of such an automatic transmission, a planetary gear device includes a sun gear, a ring gear and a carrier and controls rotation of the gears so that rotational force is transmitted from the torque converter to an output shaft at an appropriate gear shift ratio based on the relative motion of the gears.

Clutches, brakes, etc. are used to control the connection or interruption of the gears. A gear shift ratio is determined depending on the arrangement of the clutches and brakes or a change in their number, thereby realizing a desired gear speed.

FIG. 1 is a view illustrating the construction of a conventional brake used in an automatic transmission. A plurality of brake plates 3 are installed in a transmission casing 6 so as to be movable in a transverse direction. A plurality of brake discs 2 are provided on a circumferential outer surface of a rotary body 1 so as to be movable in the transverse direction. The rotary body 1 is coaxially provided with an input shaft of the transmission. The brake discs 2 and the brake plates 3 are provided in alternation.

A brake piston 5 is provided in a side of the brake. The operation of the brake piston 5 using hydraulic pressure puts the brake plates 3 and the brake discs 2 into close contact with each other under pressure, thus restraining the rotation of the rotary body 1 so that rotary elements of the planetary gear device connected to the rotary body 1 are fixed.

An end play adjustment plate 4 of a predetermined thickness is provided between the brake piston 5 and the corresponding brake plate 3 to adjust an end play Y therebetween. The end play adjustment plate 4 is installed in the transmission casing 6 so as to be movable in the transverse direction in the same manner as are the brake plates 3.

The end play adjustment plate does not cause any problems in the general gear shift mechanism. However, in a multi-step transmission structure, a comparatively small inner diameter of the end play adjustment plate interferes with other elements, which leads to several problems.

The inner diameter of the end play adjustment plate is equal to that of each brake plate and is smaller than the outermost diameter of a clutch assembly 7 that is disposed inside the brake assembly. During the assembly of the brake and clutch that form a friction device of the transmission, the end play adjustment plate interferes with peripheral elements such as the clutch assembly. This makes the work of re-assembling the end play adjustment plate difficult. To carry out the re-assembly of the end play adjustment plate, in addition to a main line along which the brake assembly and the clutch assembly are assembled, a buffer line must be added for the assembly of an oil pump.

In detail, after the brake assembly that includes the brake plates and the brake discs has been installed in the transmission casing, the end play adjustment plate is assembled with the brake assembly. The clutch assembly is thereafter assembled. The oil pump along with the brake piston is assembled.

If the end play between the brake piston and the end play adjustment plate is not suitable, the end play adjustment plate must be replaced. Here the cumbersome operation of having to separate the clutch assembly from the transmission and re-assemble it must be carried out. As such, to switch out the end play adjustment plate, the operations of separating the clutch assembly from the transmission and then re-assembling it are required. Therefore, the separate buffer line along which re-assembly of the end play adjustment plate and the clutch assembly and assembly of the oil pump are performed must be provided parallel to the main line. Such an additional assembly line increases the cost of equipment.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a friction device assembly structure for an automatic transmission in which the inner diameter of an end play adjustment element that is provided to adjust the end play between a first friction device and a piston is designed such that the end play adjustment element does not interfere with a second friction device which is assembled later, thus enhancing the ease of assembly of the friction device, and avoiding the problem of an additional assembly line being required.

Various aspects of the present invention provide for a friction device assembly structure for an automatic transmission in which the inner diameter of the end play adjustment element is increased, thus reducing the production cost and weight of a part that is provided to adjust the end play.

Various aspects of the present invention provide for a friction device assembly structure for an automatic transmission, including: a first friction device comprising a plurality of discs and a plurality of plates alternately arranged and configured such that a frictional force is created between the discs and the plates by a pressing force of a piston; and an end play adjustment element provided on an end of the first friction device to adjust an end play defined between the first friction device and the piston, the end play adjustment element being hollow such that an inner diameter thereof is greater than a diameter of an outermost portion of a second friction device which is provided inside the first friction device, whereby the end play adjustment element is able to be assembled without creating interference with the second friction device.

Each of the friction device and the second friction device may comprise a multi-plate brake or a multi-plate clutch.

The first friction device may comprise a low & reverse brake, and the second friction device may comprise an overdrive clutch.

The end play adjustment element may have a hollow plate shape. An outer edge of the end play adjustment element may be provided on an inner surface of a transmission casing so as not to be rotatable.

In various friction device assembly structures for an automatic transmission according to the present invention, the inner diameter of an end play adjustment element may be greater than the outer diameter of a clutch assembly which is assembled after the assembly of the end play adjustment element has been finished. Thus, when the end play between the end play adjustment element and the brake piston must be changed, only the end play adjustment element can be removed from and then re-assembled with the transmission without disassembling the clutch assembly. Therefore, the ease of assembly of the friction device can be markedly enhanced. Furthermore, besides a main line for the assembly of the friction device, a buffer line for re-assembly of the clutch assembly and assembly of an oil pump is not required, thus reducing the cost of the equipment additionally required of the assembly line.

Moreover, the inner diameter of the end play adjustment element may be comparatively large. The amount of material required to form the end play adjustment element is thus reduced by an increment of the inner diameter, thereby markedly reducing the production cost and the weight of the element.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
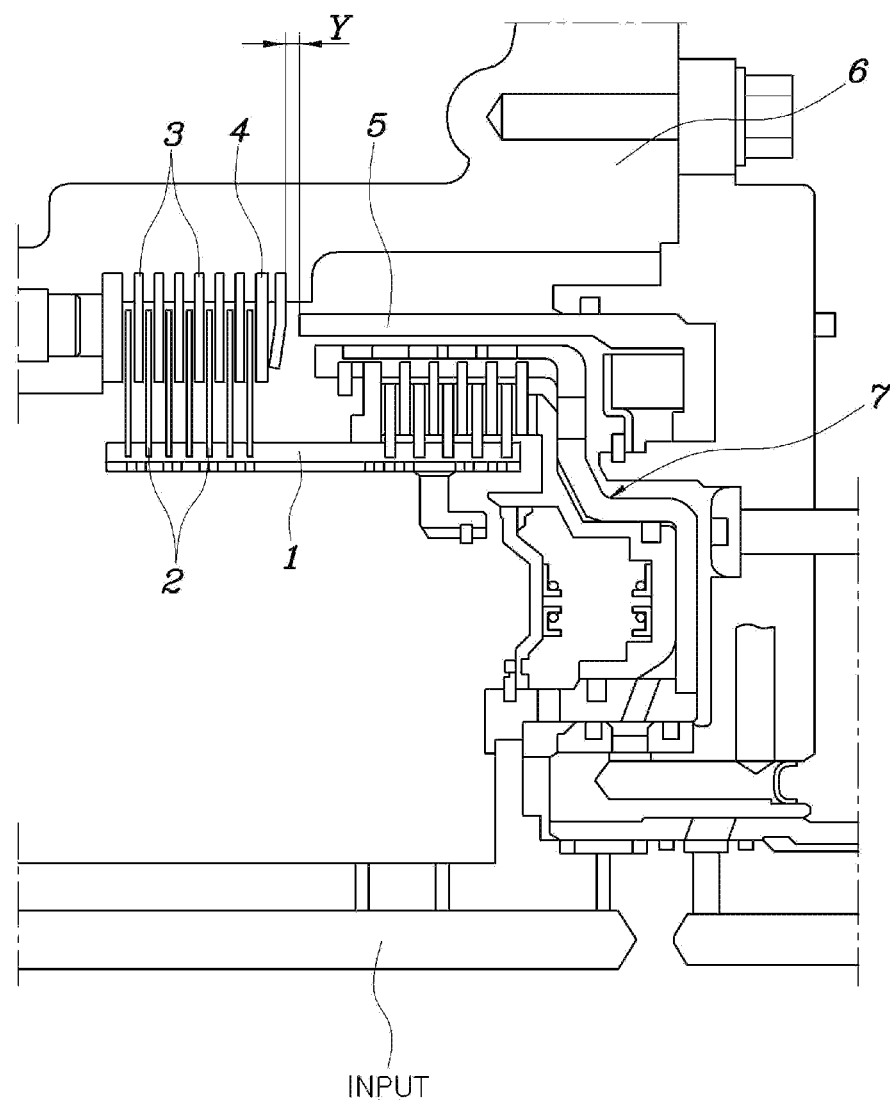
FIG. 1 is a view illustrating an installation structure of a friction device for an automatic transmission according to a conventional technique.
Figure 2:
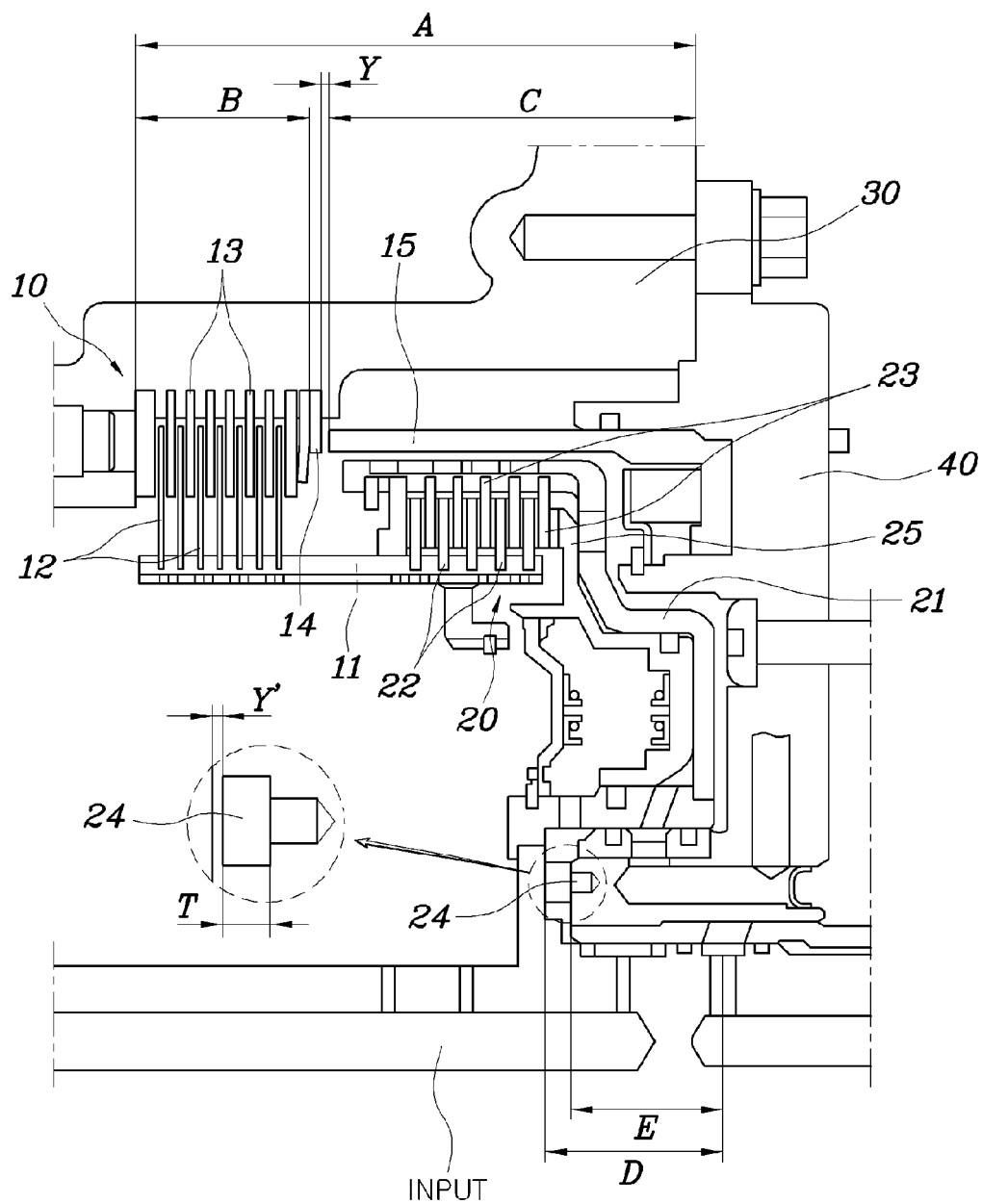
FIG. 2 is a view illustrating an exemplary installation structure of a friction device for an automatic transmission according to the present invention.

Referring to FIG. 2, a friction device assembly structure for an automatic transmission according to the present invention includes a first friction device 10 and an end play adjustment element 14. The first friction device 10 includes a plurality of discs 12 and a plurality of plates 13 which are alternately arranged and are configured such that the discs 12 and the plates 13 apply frictional force to each other by the pressing force of a piston 15. The end play adjustment element 14 is provided on an end of the first friction device 10 and adjusts an end play Y defined between the first friction device 10 and the piston 15. The end play adjustment element 14 is hollow, and an inner diameter thereof is greater than an outermost diameter of a second friction device 20 which is provided inside the first friction device 10, so that the end play adjustment element 14 can be assembled without interference from the second friction device 20.

Each of the first friction device 10 and the second friction device 20 may be a multi-plate brake or multi-plate clutch. The first friction device 10 may be a brake, and the second friction device 20 may be a clutch.

Particularly, the first friction device 10 may be a low & reverse brake, and the second friction device 20 may be an overdrive clutch.

The installation structure of the first friction device 10 and the second friction device 20 will be explained. A brake which serves as the first friction device 10 may be installed in a transmission casing 30, and a clutch may be installed inside the brake.

In the brake, the brake plates 13 are configured such that circumferential outer edges thereof are provided on an inner surface of the transmission casing 30 so as to be movable in a transverse direction but not be rotatable. Circumferential inner edges of the brake discs 12 are spline-coupled to a circumferential outer surface of a first end of a rotary body 11 so that the brake discs 12 can move in the transverse direction with respect to the rotary body 11 but not be allowed to rotate. Here, the brake plates 13 and the brake discs 12 alternate with each other so that a plurality of friction pairs are formed. The rotary body 11 is concentrically provided with an input shaft so that the rotary body 11 can rotate around the input shaft.

The end play adjustment element 14 is provided on a rear end of the brake on which a brake plate 13 or a brake disc 12 is disposed, in other words, on the end of the brake that faces the brake piston 15. The end play adjustment element 14 has a hollow plate shape and is configured such that an outer edge thereof is provided on the inner surface of the transmission casing 30 so as not to be rotatable with respect to the transmission casing 30.

In detail, the end play adjustment element 14 is configured such that the circumferential outer edge thereof is provided on the inner surface of the transmission casing 30 so as to be movable in the transverse direction but not be rotatable with respect to the transmission casing 30 in the same manner as that of the brake plate 13. The thickness of the end play adjustment element 14 is greater than that of the brake plate 13. The inner diameter of the end play adjustment element 14 must be greater than the outermost diameter of a clutch assembly which will be explained later herein.

In the clutch, a plurality of clutch plates 23 are configured such that outer edges thereof are provided on an inner surface of a retainer 21 so as to be movable in the transverse direction but not be rotatable with respect to the retainer 21. Circumferential inner edges of the clutch discs 12 are spline-coupled to a circumferential outer surface of a second end of the rotary body 11 so that the clutch discs 22 can move in the transverse direction with respect to the rotary body 11 but not be allowed to rotate. Here, the clutch plates 23 and the clutch discs 22 alternate with each other so that a plurality of friction pairs are formed.

A clutch piston 25 is provided on a side of the retainer 21 so as to be movable in the transverse direction. The clutch piston 25 uses hydraulic pressure to pressurize the clutch plates 23 and the clutch discs 22 up against each other so that frictional force can be created between the clutch plates 23 and the clutch discs 22 and so that the plates 23 and the discs 22 can rotate. The clutch piston 25 is supported by a spring unit (not designated by a reference numeral). Thus, upon the removal of the hydraulic pressure that was pressurizing the clutch, the clutch piston 25 returns to its original position so that the frictional force that was being generated between the clutch plates 23 and the clutch discs 22 is no longer present.

An oil pump 40 is provided on a side of the clutch. An end play adjustment washer 24 is disposed between the oil pump 40 and the input shaft to adjust an end play Y' with respect to the axial direction of the input shaft.

A first end of the brake piston 15 is provided on an outer surface of the oil pump 40. A second end of the brake piston 15 faces the end play adjustment element 14. The brake piston 15 moves towards the end play adjustment element 14 under the influence of the hydraulic pressure supplied from the oil pump 40, thus putting the brake plates 13 and the brake discs 12 in close contact with each other. Furthermore, the first end of the brake piston 15 is supported by a spring unit (not designated by a reference numeral). Thus, upon the removal of the hydraulic pressure that was being applied to the end play adjustment element 14, the brake piston 15 returns to its original position so that the frictional force that was being generated between the brake plates 13 and the brake discs 12 ceases to exist.

The operation and effect of the present invention will be described in detail.

A process of assembling the friction device of the automatic transmission provided with the end play adjustment element 14 according to the present invention will be explained. The brake assembly that includes the brake plates 13 and the brake discs 12 are installed in the transmission casing 30.

Subsequently, the length of the brake disc set provided with the brake plates 13 and the brake discs 12 is measured. A length between an inner end of the transmission that is adjacent to the brake disc set and a junction surface between the oil pump 40 and the transmission casing 30 is measured.

Thereafter, the clutch assembly is assembled. First, the length between the junction surface between the oil pump 40 and the transmission casing 30 and the second end of the brake piston 15 is measured, and then the end play adjustment element 14 is coupled to a side of the brake disc set. That is, as shown in FIG. 2, after all of the lengths A, B and C are measured, the end play adjustment element 14 that has an appropriate thickness is installed between the brake disc set and the brake piston 15. Therefore, the end play Y between the end play adjustment element 14 and the brake piston 15 can be adjusted by the end play adjustment element 14.

Even if the determination that the end play Y is not suitable is made after the assembly process has been completed, the clutch assembly is not required to be disassembled in order to adjust the end play Y. In the present invention, the end play Y can be easily adjusted by replacing only the end play adjustment element 14 with another end play adjustment element 14 that can form the appropriate end play Y.

As stated above, in the friction device assembly structure of the automatic transmission according to the present invention, the inner diameter of the end play adjustment element 14 is greater than the outer diameter of the clutch assembly which is assembled after the assembly of the end play adjustment element 14 has finished. Thus, the end play adjustment element 14 can be disassembled from or assembled with the transmission without the interference of the clutch assembly. Therefore, when the end play Y between the end play adjustment element 14 and the brake piston 15 must be adjusted, only the end play adjustment element 14 can be separated from the transmission without having to disassemble the clutch assembly. As a result, the ease of assembly of the first friction device 10 of the automatic transmission can be markedly enhanced.

Furthermore, after the clutch assembly and the end play adjustment element 14 have been assembled with each other, the end play adjustment element 14 can be re-assembled individually without having to remove the clutch assembly. Besides a main line, a buffer line required to re-assemble the clutch assembly and for assembly of the oil pump 40 is not required. Therefore, the cost of equipment can be reduced.

In addition, the inner diameter of the end play adjustment element 14 is comparatively large. Hence, the amount of material required to form the end play adjustment element 14 is reduced by an increment of the inner diameter, thus markedly reducing the production cost and the weight of the element.

After the end play adjustment washer 24 along with the end play adjustment element 14 has been assembled, the oil pump 40 is assembled with the clutch. Here, as shown in FIG. 2, the length D (between the junction surface between the transmission casing and the oil pump and a surface that axially faces the end play adjustment washer) and the length E (between the junction surface between the transmission casing and the oil pump and a surface into which the end play adjustment washer is fitted) are measured first. Thus, the end play Y' between the end play adjustment washer 24 and the input shaft can be adjusted by the thickness T of the end play adjustment washer 24.

For convenience in explanation and accurate definition in the appended claims, the terms rear and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A friction device assembly structure for an automatic transmission, comprising:
    a rotary body being coaxially provided with an input shaft;
    a first friction device including a plurality of discs and a plurality of plates alternately arranged wherein a pressing force of a piston creates a frictional force between the discs and the plates;
    a second friction device having an outer diameter which is smaller than an outer diameter of the first friction device; and
    an end play adjustment element provided on an end of the first friction device to adjust an end play defined between the first friction device and the piston, the end play adjustment element being hollow such that an inner diameter thereof is greater than a diameter of an outermost portion of the second friction device, whereby the end play adjustment element is assembled without interference with the second friction device;

wherein inner portions of both the first friction device and the second friction device are engaged to the rotary body, respectively.

2. The friction device assembly structure as set forth in claim 1, wherein each of the first friction device and the second friction device comprises a multi-plate brake or a multi-plate clutch.

3. The friction device assembly structure as set forth in claim 1, wherein the first friction device comprises a low & reverse brake, and the second friction device comprises an overdrive clutch.

4. The friction device assembly structure as set forth in claim 1, wherein the end play adjustment element has a hollow plate shape, and an outer edge of the end play adjustment element is provided on an inner surface of a transmission casing so as not to be rotatable.

* * * * *